United States Patent [19]

Sun

[11] Patent Number: 4,789,727

[45] Date of Patent: Dec. 6, 1988

[54] REDUCTION OF CATALYST USAGE IN EPOXIDE/CO$_2$ POLYMERIZATION

[75] Inventor: Hsiang-Ning Sun, Media, Pa.

[73] Assignee: Arco Chemical Company, Newtown Square, Pa.

[21] Appl. No.: 134,647

[22] Filed: Dec. 18, 1987

[51] Int. Cl.$^4$ .............................................. C08G 63/42
[52] U.S. Cl. ..................................... 528/405; 528/406
[58] Field of Search ................................ 528/405, 406

[56] References Cited

U.S. PATENT DOCUMENTS

| | | | |
|---|---|---|---|
| 3,689,462 | 9/1972 | Maximovich | 528/405 X |
| 3,699,079 | 10/1972 | Haynes | 528/406 X |
| 3,706,713 | 12/1972 | Hull et al. | 528/405 X |
| 3,896,090 | 7/1975 | Maximovich | 528/405 X |
| 3,953,383 | 4/1976 | Inoue et al. | 528/405 X |
| 4,166,898 | 9/1979 | Kambe et al. | 528/405 |
| 4,500,704 | 2/1985 | Kruper et al. | 528/405 |
| 4,686,276 | 8/1987 | Myers | 528/405 X |

*Primary Examiner*—Earl Nielsen
*Attorney, Agent, or Firm*—Lewis J. Young

[57] ABSTRACT

The catalyst efficiency of zinc carboxylate catalyst in the copolymerization of alkylene oxides with carbon dioxide to form polycarbonates has been increased by the addition of a small amount of certain diepoxides to the reaction.

6 Claims, No Drawings

REDUCTION OF CATALYST USAGE IN EPOXIDE/CO₂ POLYMERIZATION

BACKGROUND OF THE INVENTION

The present invention is directed to an improved process for the copolymerization of epoxides with carbon dioxide.

Epoxides are known to copolymerize with carbon dioxide, with metal containing catalysts such as zinc diethyl with additives, zinc dicarboxylates, and metal porphyrin complexes.

The resulting copolymers have alternating epoxide and carbon dioxide groups, and are polycarbonates. These copolymers have found uses in many areas, such as ceramic binders, evaporative pattern casting and adhesives. Epoxides shown to proceed readily in this reaction are ethylene oxide, propylene oxide, cyclohexene oxide, cis-2-butene oxide, and others.

When zinc dicarboxylates are used as catalysts, the required quantity is usually fairly high, due to their relatively low activities under the reaction conditions. This creates some undesirable side effects, such as catalyst removal and added costs. It is therefore desirable to increase the activity of the catalysts, thus producing the polymers at lower costs.

BRIEF SUMMARY OF THE INVENTION

We have now found that the activity of zinc dicarboxylate catalysts can be greatly improved, thus reducing the amount of catalyst needed, by adding to the reaction mixture certain difunctional epoxides, such as dicyclopentadiene diepoxide. These difunctional epoxides do not incorporate into the desired polymers to any significant degree, so that the properties of the polymers are not effectively altered.

DETAILED DESCRIPTION OF THE INVENTION

The amount of zinc dicarboxylate catalyst needed to copolymerize epoxides with carbon dioxide can be significantly reduced by adding to the polymerization mixture a small amount of certain difunctional epoxides.

The epoxides useful in the invention are the various alkylene oxides and cycloalkylene oxides. Examples of these are ethylene oxide, propylene oxide, cyclopentene oxide, cyclohexene oxide, cis-2-butene oxide, styrene oxide, epichlorohydrin, and many others. Mixtures of two or more epoxides can also be copolymerized with carbon dioxide by the instant process.

Suitable difunctional epoxides may be those having the general formula

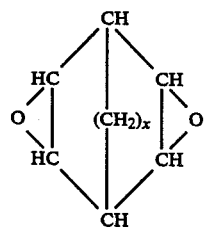

where x may be from 1 to 4. One such diepoxide is bicyclo[2.2.1]hepta-2,5-diene dioxide. Another example of a suitable diepoxide which does not fit the general formula is dicyclopentadiene dioxide. The main criterion for the dioxide is that it not enter into the copolymer to a great enough extent to alter the properties of the copolymer substantially. The amount of diepoxide useful in the invention is from about 0.1 to 5.0 parts per part of catalyst, preferably 0.1 to 1.25 parts per part of catalyst.

The suitable catalysts for the invention are the various zinc dicarboxylates. These include zinc malonate, zinc succinate, zinc glutarate, zinc adipate, zinc hexafluoroglutarate, zinc pimelate, zinc suberate, zinc azelate, zinc sebacate, etc. The copolymer is prepared by reacting a mixture of the epoxide(s) in a solvent such as methylene chloride or hexane under a pressure of 100 to 700 psig of carbon dioxide using a zinc carboxylate catalyst for up to 40 hours at 25° to 110° C. in accordance with the polymerizations described in either Soga et al, Polymer J. 16, 407 (1981) or Inoue, Makromol. Chem., Rapid Commun. 1, 775 (1980), both of which are hereby incorporated in their entirety herein.

Thus, Soga et al teach copolymerization of propylene oxide and carbon dioxide by heating at 60° C. for 40 hours using zinc carboxylate catalysts supported on such materials as silicon dioxide, magnesium oxide and aluminum oxide. Inoue used catalysts prepared by the reaction of zinc oxide with aromatic dicarboxylic acids to polymerize propylene oxide in carbon dioxide at 35° C. for 40 hours.

The carbon dioxide can be added to the polymerization reaction in a wide range of pressures. In order to have a useful rate of polymerization, the pressure is preferably at least 100 psig but lower pressures can be tolerated. The upper limit of carbon dioxide pressure is limited only by the equipment in which the polymerization is run.

The polymerization temperature is preferably between about 40° and 150° C. more preferably between 55° and 120° C. . Too low a temperature will render the rate of polymerization too slow. Too high a temperature may result in polymer decomposition.

Many polar and nonpolar solvents are suitable for the reaction medium as long as they are purified and dried. Especially useful are hexane, toluene, tetrahydrofuran, methylene chloride, methyl acetate, and mixtures of these. It should be pointed out that although solvents may, facilitate product removal from the reactor, the reaction can be carried out without a solvent.

Reaction time is generally dependent on the other reaction conditions, especially temperature and carbon dioxide pressure, to give good yields. Certain epoxides may also react slower. But, in general, one hour to 24 hours reaction time is adequate for most polymerizations. Under more favorable conditions, one to five hour reaction time is sufficient.

The following example is meant to illustrate but not limit the invention. All percentages and parts are by weight unless otherwise specified.

EXAMPLE I

To a 500 ml stainless steel autoclave is charged a suspension of the following ingredients: 30 parts of propylene oxide, the parts of zinc sebacate catalyst indicated in the Table, the parts of diepoxide indicated in the Table, and 60 parts of hexane. The reactor is purged with nitrogen followed by the addition of carbon dioxide. The mixture is then polymerized according to the method described in Soga et al. The polymer solution is then treated with an equal volume of methanol to precipitate the polymer. The polymer is filtered off and washed with methanol. The wet polymer is then dried at 65° C. under vacuum to give the yields of polymer shown in the Table. Purity of the polypropylene carbonate obtained is at least 99% as determined by infrared and nuclear magnetic resonance spectroscopies. The product has less than 0.1% incorporation of the diepoxide into the polycarbonate product.

TABLE I

| Run | Catalyst, g. | DCO, g.[a] | Yield, % |
|---|---|---|---|
| Control | 6 | 0 | 65 |
| Control | 3 | 0 | 32 |
| A | 6 | 7.5 | 75 |
| B | 3 | 0.5 | 65 |

[a]DCO is dicyclopentadiene dioxide.

From the Table, it can be seen that the addition of from about 0.1 to 1.25 parts of certain diepoxides per part of catalyst can substantially increase the activity of the catalyst allowing the amount of catalyst needed to be lowered.

EXAMPLE II

To a 500 ml stainless steel autoclave is charged a suspension of the following ingredients: 7 parts of propylene oxide, 23 parts of cyclohexene oxide, the parts of zinc adipate catalyst indicated in the Table, the parts of diepoxide indicated in the Table, and 60 parts of methylene chloride. The reactor is purged with nitrogen followed by the addition of carbon dioxide. The mixture is then polymerized according to the method described in Soga et al. The polymer solution is then treated with an equal volume of methanol to precipitate the polymer. The polymer is filtered off and washed with methanol. The wet polymer is then dried at 65° C. under vacuum to give the yields of polymer shown in Table II. Purity of the polypropylene carbonate/cyclohexene carbonate terpolymer obtained is at least 99% as determined by infrared and nuclear magnetic resonance spectroscopies. The product has less than 0.1% incorporation of the diepoxide into the polycarbonate product.

TABLE II

| Run | Catalyst, g. | BHD, g.[a] | Yield, % |
|---|---|---|---|
| Control | 6 | 0 | 75 |
| Control | 3 | 0 | 36 |
| A | 6 | 7.5 | 85 |
| B | 3 | 0.5 | 75 |

[a]BHD is bicyclo[2.2.1]hepta-2,5-diene dioxide.

EXAMPLE III

To a 500 ml stainless steel autoclave is charged a suspension of the following ingredients: 30 parts of propylene oxide, the parts of zinc glutarate catalyst indicated in the Table, the parts of diepoxide indicated in the Table, and 60 parts of methylene chloride. The reactor is purged with nitrogen followed by the addition of carbon dioxide. The mixture is then polymerized according to the method described in Soga et al. The polymer solution is then treated with an equal volume of methanol to precipitate the polymer. The polymer is filtered off and washed with methanol. The wet polymer is then dried at 65° C. under vacuum to give the yields of polymer shown in Table III. Purity of the polypropylene carbonate obtained is at least 99% as determined by infrared and nuclear magnetic resonance spectroscopies. The product has less than 0.1% incorporation of the diepoxide into the polycarbonate product.

TABLE I

| Run | Catalyst, g. | DCO, g.[a] | Yield, % |
|---|---|---|---|
| Control | 6 | 0 | 70 |
| Control | 3 | 0 | 34 |
| A | 6 | 7.5 | 80 |
| B | 3 | 1.0 | 80 |
| C | 3 | 0.5 | 70 |
| D | 1.5 | 1.0 | 80 |

[a]DCO is dicyclopentadiene dioxide.

From the Table, it can be seen that the addition of from about 0.1 to 1.25 parts of certain diepoxides per part of catalyst can substantially increase the activity of the catalyst allowing the amount of catalyst needed to be lowered.

We claim:

1. In a process for preparing polyalkylene carbonates by the reaction of alkylene oxides with carbon dioxide in the presence of a catalyst comprising zinc carboxylate, the improvement comprising adding from about 0.1 to 5. part per part of catalyst of a diepoxide to increase the yield of polycarbonate formed.

2. The process of claim 1 wherein the alkylene oxides are selected from the group consisting of ethylene oxide, propylene oxide, cyclopentene oxide, cyclohexene oxide, cis-2-butene oxide, styrene oxide, epichlorohydrin, and mixtures of these.

3. The process of claim 1 wherein the zinc carboxylate is selected from the group consisting of zinc malonate, zinc succinate, zinc glutarate, zinc adipate, zinc hexafluoroglutarate, zinc pimelate, zinc suberate, zinc azelate, zinc sebacate, and mixtures thereof.

4. The process of claim 1 wherein said difunctional epoxides have the general formula

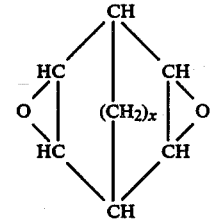

where x may be from 1 to 4.

5. The process of claim 1 wherein the diepoxide added is dicyclopentadiene dioxide.

6. The process of claim 1 wherein the diepoxide added is bicyclo[2.2.1]hepta-2,5-diene dioxide.

* * * * *